United States Patent [19]

Hayes, Jr.

[11] Patent Number: 5,894,596
[45] Date of Patent: Apr. 13, 1999

[54] METHOD AND APPARATUS FOR ESTABLISHING ACTIVATION DATE FOR A CELLULAR TELEPHONE

[75] Inventor: John Joseph Hayes, Jr., Wake Forest, N.C.

[73] Assignee: Ericsson Inc., Research Triangle Park, N.C.

[21] Appl. No.: 08/698,803

[22] Filed: Aug. 16, 1996

[51] Int. Cl.[6] .................................................. H04M 3/00
[52] U.S. Cl. ........................ 455/418; 455/410; 455/575
[58] Field of Search .............................. 455/422, 409, 455/410, 418, 420, 423, 425, 88, 550, 575, 414, 419

[56] References Cited

U.S. PATENT DOCUMENTS 5,046,082  9/1991  Zicker et al. ........................... 455/410
5,060,295  10/1991  Borras et al. .......................... 455/186
5,386,468  1/1995  Akiyama et al. ........................ 380/25

FOREIGN PATENT DOCUMENTS

0 652 681 A2  5/1995  European Pat. Off. .
WO 95/04425  2/1995  WIPO .

*Primary Examiner*—Nguyen Vo
*Attorney, Agent, or Firm*—Nixon & Vanderhye P.C.

[57] ABSTRACT

An apparatus and method to determine the warranty period for a cellular telephone based on the date on which the telephone was first activated for use in a cellular telephone network. The apparatus includes a cellular telephone having a non-volatile memory, and a section allocated for activation data within that memory. Within the memory area allocated for activation data is stored the first date on which the telephone was activated. The memory location for receiving the first date of activation is protected from being rewritten during subsequent activations of the cellular telephone by a date.

19 Claims, 5 Drawing Sheets

METHOD AND APPARATUS FOR ESTABLISHING ACTIVATION DATE FOR A CELLULAR TELEPHONE

TECHNICAL FIELD

The present invention relates generally to cellular mobile radio telephones. In particular, the invention relates to a novel technique for activating newly purchased radio telephones and storing the first activation date in the cellular radio telephone. The invention also relates to a novel technique for refurbishment of cellular radio telephones and reactivating them in a manner that stores the first reactivation date after being refurbished in the radio telephone.

BACKGROUND

Cellular telephones have become extremely popular with business and personal users. Customers usually purchase cellular telephones from a retail store or a cellular telephone network service provider. The telephones are manufactured by companies who generally do not own or control the retail stores and service providers that sell the cellular telephone to the customer who ultimately buys and uses the telephone. Once a cellular telephone manufacturer ships a telephone from its warehouse, the manufacturer loses control over the telephone and has no reliable way to determine when the telephone is sold to a consumer.

The manufacturers of cellular telephones conventionally provide a warranty with the sale of their cellular telephones. The warranty guarantees to consumer purchasers of the cellular telephone that the manufacturer will repair or replace the cellular telephone for a set period of time, such as one year, after purchasing the telephone. The warranty obligates the manufacturer to fix or replace telephones for a period of one year after the purchase.

Manufacturers of cellular telephones spend hundreds of thousands, if not millions, of dollars each year to comply with warranty obligations by repairing or replacing broken cellular telephones. Cellular telephones that are returned during the warranty period are repaired or replaced by the manufacturer without charge to the customer. The manufacturer must absorb the cost of making repairs or replacements of cellular telephones that have become broken within their warranty.

Until now, manufacturers of cellular telephones have experienced difficulty in determining whether a telephone returned for repairs is under warranty or if its warranty is expired. Manufacturers need to know whether the warranty is still valid to know whether to repair or replace the cellular telephone for a fee or for free. To determine whether a returned cellular telephone is still under warranty, manufacturers have tried, with limited success, different methods and systems for tracking when a particular telephone was first sold to a customer. If they knew when the cellular telephone was first sold to a consumer, the manufacturer can readily determine when the warranty period expires for the telephone.

Manufacturers have had difficulty in implementing plans and methods for tracking the warranty period for individual cellular telephones. All too often, manufacturers replace or repair cellular telephones free of charge when the broken cellular telephone is no longer under warranty. There is a long-felt need by manufacturers of cellular telephones for a method to precisely ascertain the start date for the warranty period for each cellular telephone that they sell. If the start of the warranty period for each cellular telephone sold can be readily determined, then the manufacturer can determine whether a telephone returned for repair is under warranty.

In the past, manufacturers have attempted to determine when the returned cellular telephones have been placed into service to ascertain whether the returned phone is still under warranty. The past techniques for determining when cellular telephones have been placed into service are inadequate and inaccurate. Techniques for determining when telephones have been placed into service include estimating the date on which the telephone was sold to the consumer by knowing the date on which the telephone is manufactured and adding an average number of days between when telephones are manufactured and when they are sold to consumers. This estimating technique has the serious disadvantage that the average time that a phone dwells in the phone distribution chain, i.e., the average time between manufacture and retail sale, does not accurately predict when each individual telephone is actually sold to an end-use customer. For example, a cellular telephone upon being manufactured may be initially stored in the manufacturer's warehouse before being distributed to a retail store or to a distributor. If the telephone is sold by a manufacturer to a distributor, the distributor may have a warehouse for storing telephones before distributing the telephones to individual sales representatives or other retail stores. Depending on how quickly an individual distributor resells the telephones or a retail store sells telephones to end-use customers, a telephone may remain in warehouse storage for many months longer than the average time that phones typically spend in the retail distribution chain.

By estimating the warranty start date based on the manufacturing date plus an average time the telephone spends in the distribution chain will result in many instances where the warranty is miscalculated. If the miscalculation results in the manufacturer declaring the warranty period to be expired when the telephone is actually still under the warranty period, the customer will become angry when told that his/her broken telephone is no longer under warranty service, when in fact it is still within the warranty period. Similarly, other customers will receive a free repair or replacement of their telephone that is no longer under its actual warranty period, but the manufacturer estimates that the warranty period to be still in effect. Accordingly, estimating the warranty period based on the average time telephones dwell in distribution channels will generally result in angry customers and warranty repairs on telephones no longer under warranty.

Another conventional technique for determining when a warranty period begins for a cellular telephone is to request the customer to submit a proof or purchase date when returning the telephone for repair. A similar technique for establishing the warranty period is to request the customer to mail a warranty card to the manufacturer after purchasing the telephone. Retail customers are notoriously poor about mailing proofs of purchase regarding their telephone to manufacturers and about retaining proof of purchase documents for use when returning a telephone for a repair. A relatively low-percentage of new customers of cellular telephones mail the postcard warranty card included with the cellular telephone packaging to the manufacturer. In addition, some customers place a wrong date of purchase, or no date of purchase, on the warranty card which may unfairly extend the warranty period for their cellular telephone. Moreover, asking the customer to submit a proof of purchase date when returning a broken cellular telephone for repair causes the customer great anger at the manufacturer because customers generally do not have the requested proof of purchase and are angry that they cannot have their telephone repaired free of charge.

Accordingly, manufacturers have experienced disgruntled customers in attempting to estimate or determine the date on which the warranty period begins and ends for the cellular telephones that they make. To avoid irritating their customers, manufacturers have typically repaired or replaced telephones without charge even when the manufacturer strongly believes that a broken telephone is no longer under warranty. There is a long-felt, but unresolved need for a method of reliably and precisely determining when a warranty period starts and ends for a cellular telephone. Prior methods for establishing the warranty period of cellular telephones have not yielded satisfactory results.

DISCLOSURE OF THE INVENTION

Manufacturers of cellular telephones desire a reliable and easy-to-administer method for determining when a warranty period expires on a particular cellular telephone that they manufactured. The warranty period generally starts with the sale of the cellular telephone to the consumer. However, as discussed above, prior techniques for determining the first date of sale of the cellular telephone have proven ineffective and unreliable. The present inventor has proposed to determine the warranty period based upon the date on which the cellular telephone is activated. Most cellular telephones are activated at the time they are sold to the consumer or within a few days or weeks after first being sold to the consumer. Accordingly, the date of activation of a cellular phone is relatively contemporaneous with the date of first sale of the telephone when the warranty legally begins.

In developing this invention, applicant encountered several difficulties which had to be overcome. In particular, a method had to be developed to ensure that the activation date was entered into non-volatile memory of the cellular telephone. To ensure that the activation date is always entered into non-volatile memory of a cellular telephone, the inventor developed a technique for checking whether the current date is included with the activation information provided to the cellular telephone by the service provider for the cellular telephone network. If the activation date is provided with other activation information, then the provided activation date is entered into nonvolatile memory of the cellular telephone. If the activation date is not included with the activation information from the service provider, then the cellular telephone is programmed to calculate the current date based upon an internal timer included with the telephone. If the internal timer is not set to provide the current activation date, then the cellular telephone presents on its display a command, such as "Enter Current Date", that prompts the user to enter the current date. The entered current date is then used as the activation date and stored in non-volatile memory of the cellular telephone.

Another difficulty encountered by applicant in developing his invention is that the activation date is not always indicative of the start of the warranty period. In particular, cellular telephones may be reactivated when their owner's subscribe to a second or subsequent cellular network service provider or when the owner reactivates a previously deactivated account with a pre-existing service providers. Each time the cellular telephone is reactivated, a new date may be received from the service provider and entered by the internal circuitry of the cellular telephone. The date of reactivation of the cellular telephone may occur months or years after the cellular telephone was originally purchased by the consumer. The date of reactivation is not a reliable indicator of the start of the warranty period of the telephone.

Most major and mid-size cities in the United States have two or more cellular telephone networks to which telephone customers may subscribe for cellular telephone service. Subscribers sometimes sign up with one cellular service provider and after several months or years either deactivate their service or switch to another one of the available telephone service providers. The subscribers who are deactivated may later resubscribe to their prior cellular service provider or later switch to another service provider. In the course of a few years, an individual or business cellular telephone customer may subscribe to two or more different cellular systems and may activate and deactivate his or her cellular service several times. Each time that a customer subscribes to a new cellular service provider or reactivates an account with an existing service provider, the cellular telephone of the user must be reactivated by the service provider. Because cellular telephones are commonly reactivated, the reactivation date is not indicative of when the telephone is first placed in service.

Cellular telephones are purchased by the individual cellular telephone customers. The cellular telephone customer often uses the same cellular telephone as the customer switches between different cellular telephone service providers, and deactivates and later reactivates cellular service with the same or different providers. Each time the customer switches to a new cellular service provider or activates a previously deactivated cellular service, the cellular telephone must be reactivated with the new data corresponding to the new account that its user has set up with the current service provider.

Manufacturers of cellular telephones have designed their telephones so that data regarding the activation of the telephone may be loaded into the phone's non-volatile memory via a serial interface, such as using a RS-232 connector, or by data transfer via radio frequency (RF) transmission. The activation data includes: the mobile identification number (MIN, or telephone number), system identification number of the home system, and other data. The activation data is provided by the cellular telephone network service provider and is not provided by the cellular telephone manufacturer. The cellular telephone service provider selects the data, such as passwords, telephone numbers and other identifying information, which the service provider downloads into the telephone.

The cellular service provider may input the activation data into the cellular telephone via a connection between a central computer system of the service provider, by manually inputting activation data into the phone from a remote location, or by transmitting activation data from a central location to the activating phones. For example, the retail store selling the cellular telephone and service provider subscription may manually enter activation information by obtaining the appropriate activation information from a voice telephone communication with an employee at the cellular telephone service provider. Alternatively, the retail store may have a direct computer connection to a central computer at the cellular telephone service provider and employ that direct connection to download activation data from the central computer directly into the cellular telephone coupled at the retail store to the retail store's computer system.

Recently, activation data has been transmitted via radio frequency (RF) transmission directly to the telephone. For example, an individual, upon subscribing to a cellular service provider, may telephone by a conventional telephone (or by using the cellular telephone being activated) the cellular service provider and make arrangements regarding a cellular telephone number, passwords and other identifying information. Upon completion of the telephone call the cellular service provider transmits an RF signal to the cellular telephone that inputs activation data to the cellular telephone. Accordingly, there are several different methods by which cellular telephones may be activated, and many different cellular service providers which activate telephones. Manufacturers of cellular telephones must adapt their telephones to be activated by any of the current activation methods and receive activation data from any of the cellular service providers.

To overcome the aforementioned difficulties, a novel and unobvious apparatus and method has been developed to determine the warranty period for a cellular telephone based on the date on which the telephone was first activated for use in a cellular telephone network. The apparatus includes a cellular telephone having a non-volatile memory, with a section allocated for activation data within that memory. Within the memory area allocated for activation data is stored the first date on which the telephone was activated. The memory location for receiving the first date of activation is protected from being rewritten during subsequent activations of the cellular telephone by a date flag, or other means that prevents the date memory location from being rewritten once the first activation date is entered into the non-volatile memory.

BEST MODE FOR CARRYING OUT THE INVENTION

Figure 1:
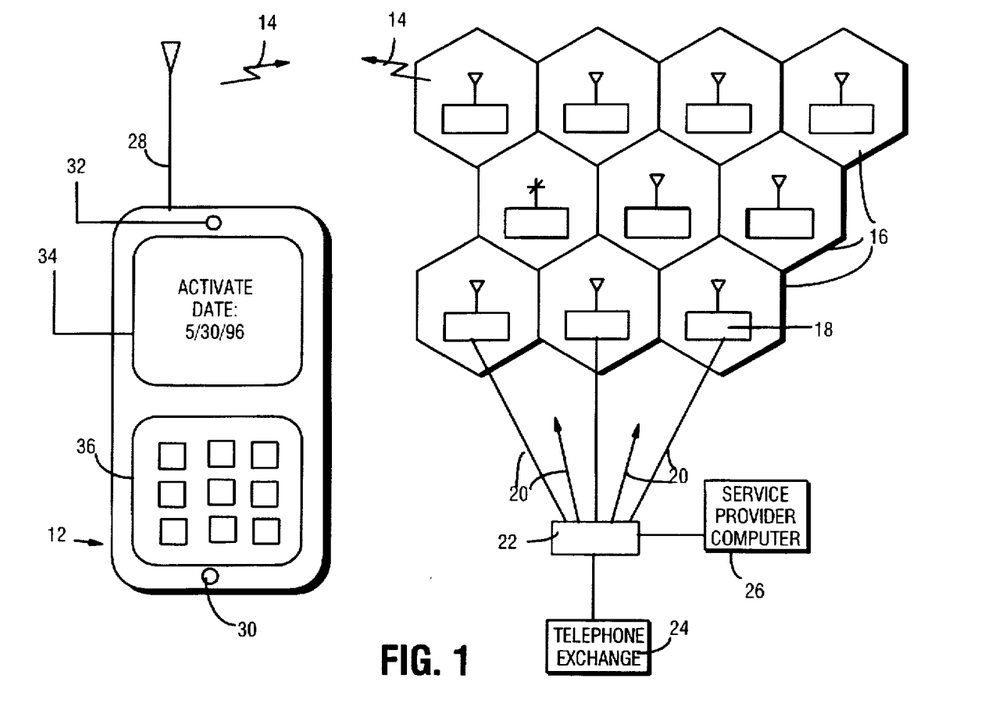
FIG. 1 is a diagram of a representative cellular telephone and cellular radiotelephone network.

FIG. 1 is a highly diagrammatic illustration of a cellular radio telephone network 10 in communication with a cellular radio telephone 12. The cellular radio telephone network may be any of the radio telephone networks that provide radio telephone service to consumers having cellular telephones. The cellular telephone network covers a certain geographic area segmented into individual radio cell sites 16, where each cell site has a transceiver 18 for transmitting and receiving cellular telephone communications to cellular telephones 12 within the cell site. Each of the individual cell site transceivers 18 are in communication, usually via a land line 20, with a central switching station 22 that couples the cellular radio telephone network to a conventional telephone exchange 24. In addition, the cellular service provider may have a computer system 26 coupled to the central switching station 22 that allows the cellular service provider to communicate with the cellular telephone 12 via the cellular network 10.

The cellular telephone may be a handset configuration as shown in FIG. 1 or may be another cell phone configuration. The cellular telephone 12 generally includes an antenna 28 for communicating radio frequency (RF) cellular radio telephone communications 14 to the nearest cell transceiver 18.

The cellular telephone 12 also includes a microphone 30 and speaker 32 so that an individual user may speak and listen to communications via the cellular telephone. In addition, the telephone may include a display 34, such as a liquid crystal display, for presenting text information to the user. As shown in FIG. 1, the display 34 shows a date of May 30, 1996, as the "activation" date for that particular telephone. The cellular telephone 12 may also include a keypad 36 for entering telephone numbers for initiating telephone calls, and for entering other information into the cellular telephone that may be used to set up the cellular telephone, such as entering pre-programmed telephone numbers to be stored in memory, or information to be communicated to the cellular telephone network 10. In addition, the display may present a command, such as "enter current date", to prompt a user to enter the current date into the keypad.

In operation the cellular telephone 12 and cellular telephone network 10 provide, at a minimum, voice communication, in either digital or analog form, between the cellular telephone 12 and the telephone exchange 24 where the link between the cellular telephone and cellular telephone network is established by radio contact between cellular telephone and a cell transceiver 18. As is well known in the cellular telephone art, the cellular telephone 12 remains in communication with the cellular network even when the telephone is transported to different geographic areas covered by the cellular network. As the cellular telephone roams within the geographic area covered by the cell sites, different individual cell transceivers 18 establish a series of radio frequency communications with the cellular telephone as the telephone enters the transceiver's respective cells.

Figure 2:
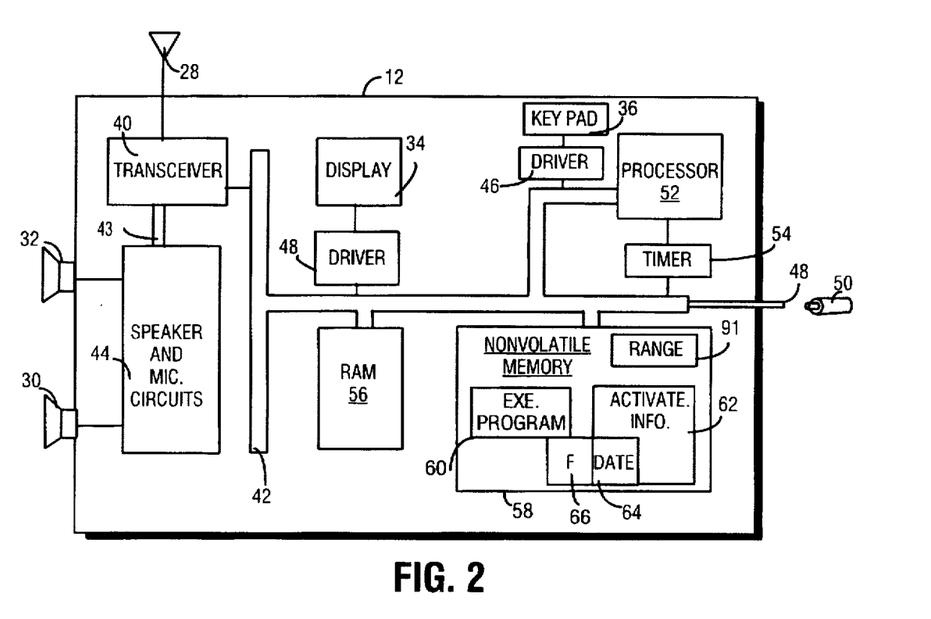
FIG. 2 is a block diagram of the cellular telephone illustrated in FIG. 1.

FIG. 2 shows a block diagram of some of the electronic components of the cellular telephone 12. The cellular telephone 12 shown in FIG. 1 is representative of the many different types of cellular telephones currently available to consumers and forseeably available in the future. Cellular telephones may support analog and/or digital voice or data communications. In addition, cellular telephones may provide only basic telephone functions, e.g., voice calls with a keypad for telephone number entry, or may provide advanced telephone communication functions, such as paging, call-forwarding, caller ID, message text communication, facsimile communications and many other types of telephoning functions.

FIGS. 1 and 2 are intended to show a representative diagram of an exemplary cellular telephone for use with the present invention. It is not intended to be representative of all of the variety and types of cellular telephones that may be used in conjunction with the present invention. The cellular telephone 12 shown in FIGS. 1 and 2 includes an antenna 28 coupled to an analog transceiver circuit 40. The transceiver circuit is connected for control purposes to a digital message bus 42. The bus 42 is illustrated as distributing digital commands, but in other telephones may be used for digital voice and text communications. In a real cellular telephone, message bus 42 may be separated into different message buses, e.g., for digital audio and commands, or in different circuits, such as an analog voice circuit 43 and a digital message bus. As shown in FIG. 2 message bus 42 is connected to many different electronic components within the cellular telephone 12.

The speaker and microphones 32, 30 are supported by speaker/microphone circuitry 44 that convey analog voice signals over a connection 43 to and from the transceiver 40 for transmission and reception via the antenna 28. Telephone numbers keyed by the user onto keypad 36 are interpreted by a keypad driver 46 that converts the keypad telephone numbers and other alphanumeric messages entered by the keypad into DTMF signals or digital signals. The DTMF signals or digital signals generated by the driver for the keypad are also placed on the bus 42. Similarly, the display 34 of the cellular telephone is controlled by a display driver 48 that converts alphanumeric information received from the message bus and directed to the driver into alphanumeric symbols for the display. In addition, the cellular telephone may have an input connector 48 so that a signal wire(s) 50 may be coupled directly to the cellular telephone.

The cellular telephone 12 is controlled electronically by a processor 52 that may be any of the microprocessors or microcontrollers typically used to control cellular telephones. The processor executes programmable instructions in order to control the operation of the cellular telephone. The processor receives timing information from a timer 54 that also provides timing signals to the message bus 42, for distribution to other digital circuit components.

The processor has available both volatile and non-volatile memory for storage of executable program instruction, data and for other purpose example, a volatile random access memory (RAM) 56 is accessible to the processor via the message bus. Similarly, memory 58 is also accessible to the processor via the message bus 42. Memory 58 is a non-volatile memory such as an electronically programmable read only memory (EPROM), an electronically erasable programmable read only memory (EEPROM), FLASH MEMORY, or an arrangement of these non-volatile memories, that retains information if battery power is lost to the cellular telephone. For example, a FLASH MEMORY chip may be used to store executable program instructions 60. Data, including activation data, may be, for example, stored in an EEPROM. The activation information is provided by the cellular telephone network service provider upon the activation of the cellular telephone and stored, for example, in the EEPROM. The activation information also includes date information that pertains to the first date on which the cellular telephone 12 was activated. Associated with the activation date information is an activation date flag 66 that may be set to value=1 to indicate that a valid date has been stored in the memory date location 64 in the activation information area 62 of the memory. If the flag is set to value 0, then the flag indicates that no date data, or no valid date data, is stored in the date memory location 64 associated with the activation information.

The activation information stored in the activation information memory location 62 in the non-volatile memory provides information regarding the information necessary to activate the particular cellular telephone 12 in the particular cellular telephone network 10. When consumers purchase cellular telephones, the cellular telephone is not activated with information designating the particular cellular network to which the telephone will be assigned, or that identifies the cellular telephone in any cellular network. Manufacturers of cellular telephones do not know the activation information which will be stored in the cellular telephones that they manufacture. The activation information is provided by the cellular telephone service provider to the cellular telephone 12 after the consumer-owner of the cellular telephone subscribes to a particular cellular network service provider.

The activation information is provided by the service provider usually by a direct line input 50 which is plugged into the line port 48 by a technician when the telephone is sold. The input signal line 50 is coupled to a computer system (such as service provider computer 26) which downloads the activation information to the cellular telephone. Alternatively, the activation information may be received via an RF message 14 from one of the cell transceivers 18. The service provider can instruct its computer 26 to cause one of the transceivers 18 to send activation messages to the cellular telephone once the cellular telephone's owner subscribes to the cellular network service. The activation information whether it is received by antenna 28 or input port 48, is written to the non-volatile memory 58 and, in particular, to the activation information memory area 62 of the non-volatile memory 58. In the present invention, the activation information received by the cellular telephone generally will include the date on which the activation information is transmitted to the cellular telephone. This date information is stored in the date memory location 64 of the activation information region 62 of the non-volatile memory 58.

The activation information stored in the non-volatile memory typically includes information regarding the mobile identification number and the system identification number of the home system. This activation information is provided by the cellular telephone service provider, and does not come from the manufacturer. This activation information may or may not include the date of the activation information. If the activation information transmitted to the cellular telephone does include date information, then the date information may be stored as date information in memory location for the date 64. If the activation information does not include date information, then the processor 52 working in conjunction with timer 54 may calculate the date of activation and store the activation date in date memory location 64. In this manner, the activation date is stored with the activation information in the non-volatile memory. Alternatively, the current date may be entered by the telephone user in response to a prompt on the display 34 of the telephone.

Figure 3A:
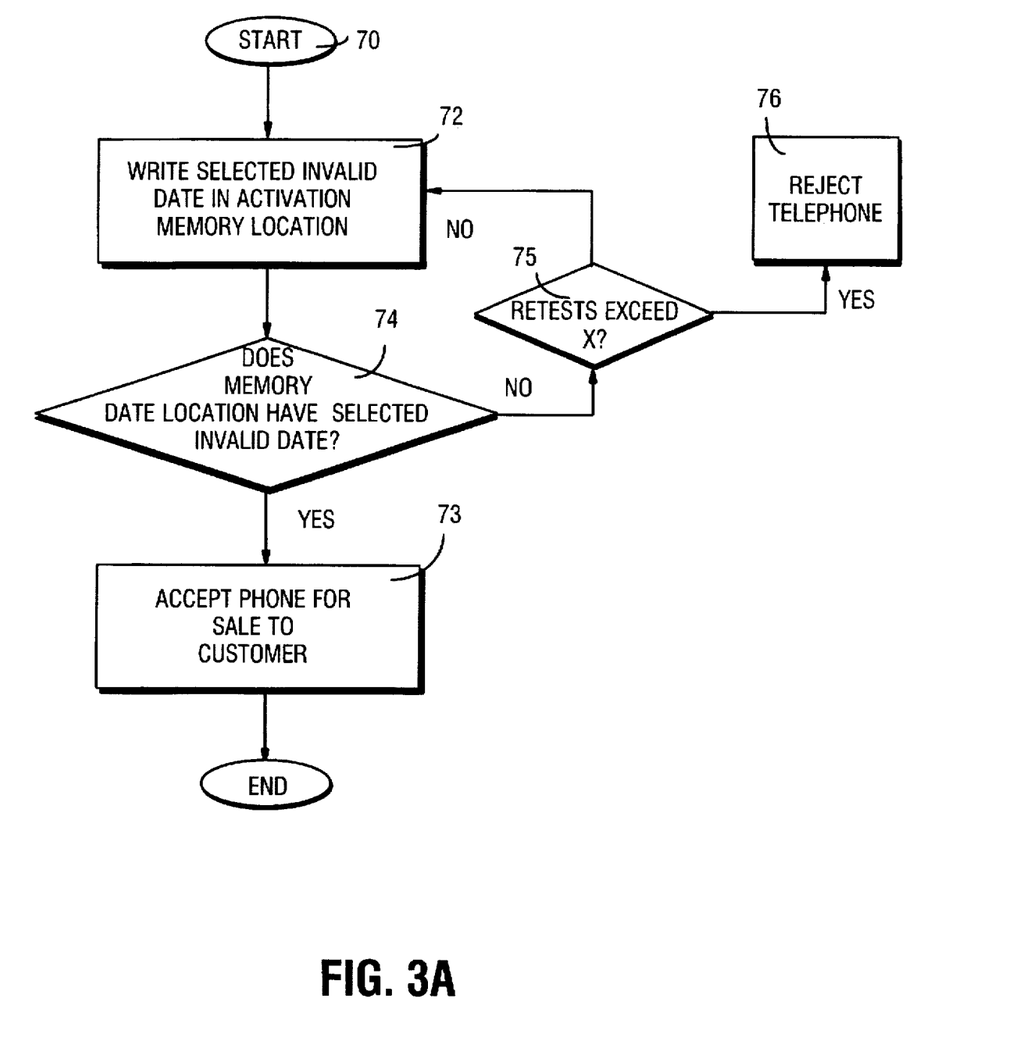
FIGS. 3A, 3B and 3C are flow charts showing steps of a representative method for activating a cellular telephone and permanently storing the first activation date of the telephone.
Figure 3B:
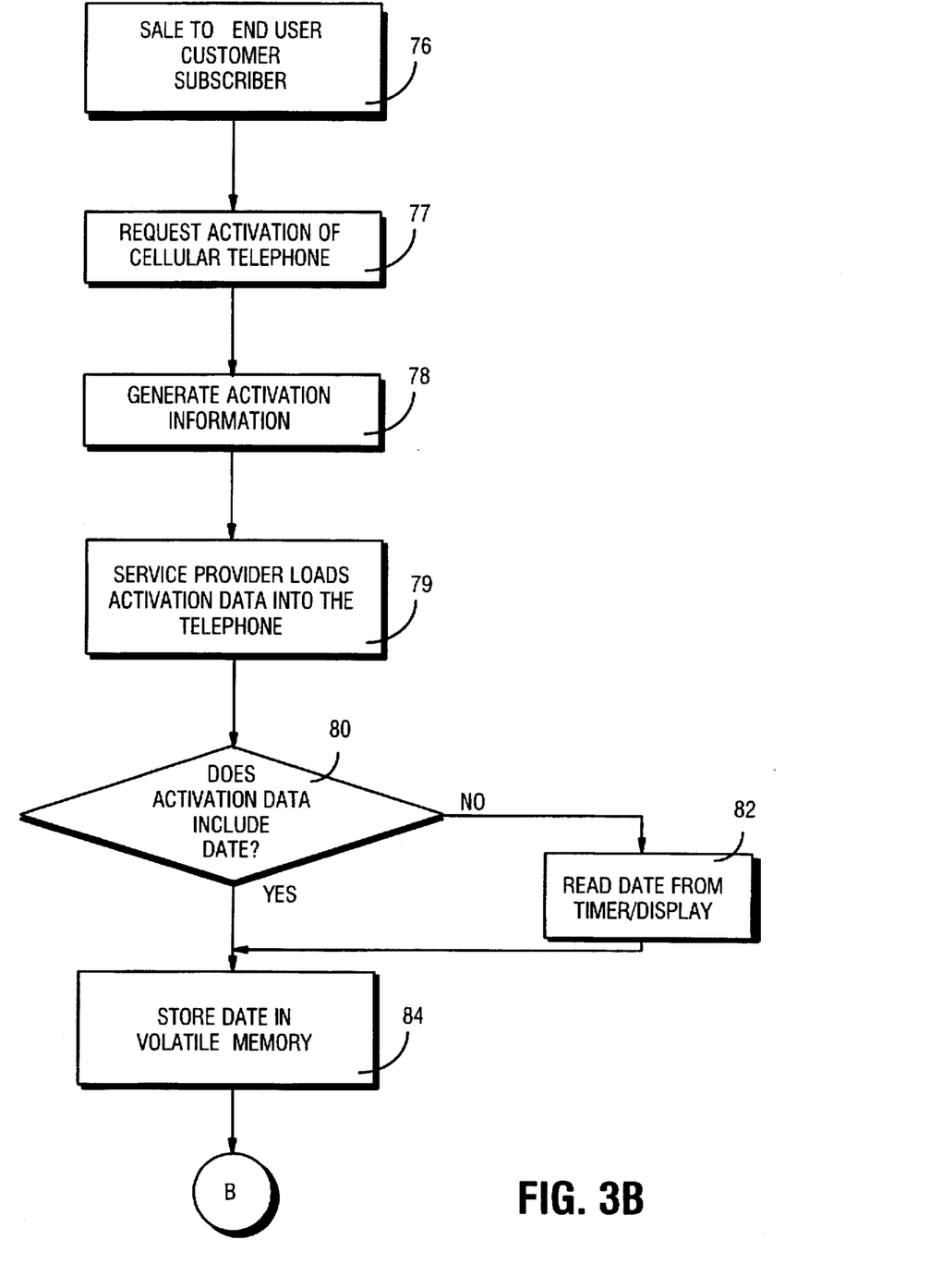
Figure 3C:
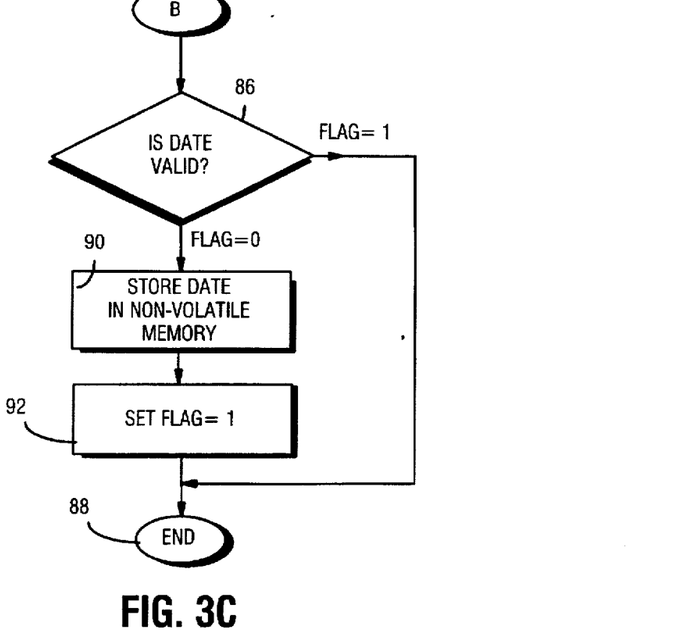

FIGS. 3A, 3B and 3C show a flowchart of steps of a preferred embodiment of a method for storing the first activation date in non-volatile memory of a cellular telephone. At the start 70 of the method, a date known to be invalid is selected and written to the memory date location 64 in the non-volatile memory. This method step 72 of entering an invalid date is generally accomplished at the factory where the cellular telephone is manufactured. The purpose of writing in a selected invalid date in the non-volatile memory is to have a date value in that memory location for use by the manufacturer to test the cellular telephone during or after the manufacturing process. In particular, the manufacturer tests the non-volatile memory and one of the tests includes verifying that the memory location 64 for the date properly stores the correct selected date information at step 74. An example of a selected invalid date may be 99/99/99 which is used if the testing procedures followed by the manufacturer include a test for such a selected invalid date to confirm that the date memory location is functioning correctly. If the cellular telephone passes the date memory location test, as well as all other tests applied by the manufacturer, then the telephone is accepted for sale in step 73.

If the date data is not the expected value, then the manufacturer may again attempt to write another selected invalid date into the date memory location 64 and retest the memory, in step 75. If again (or after a certain number (x) of attempts) the date memory location 64 fails the memory test, then the cellular telephone may be rejected by the manufacturer in step 76. Steps 70 to 74 of the flow chart shown in FIG. 3A are performed by the manufacturer, usually at the factory. Alternatively (or in addition to) a date flag 66 may be set to zero (0) or other state signifying that no valid activation date is stored in memory. A process for testing the date filing may be used that is similar to the process used to test the date memory location.

If the invalid date data passes the manufacturer's memory test, and the telephone passes the manufacturer's other tests, then the telephone is ready for sale and sold to a consumer subscriber in step 76. Steps 76 to 92 of FIGS. 3B and 3C are performed after the telephone has been sold and delivered to the subscriber. After the telephone is sold to an end-use customer, typically a consumer, the end-use customer will subscribe to a cellular telephone service provider. Typically the cellular telephone service provider sells the telephone to the customer. The consumer usually subscribes to a cellular service provider when the telephone is purchased or shortly thereafter. When the customer subscribes to a cellular telephone service, the service provider will input activation information into the cellular telephone.

Once the end-use customer, i.e., the subscriber, has subscribed to a cellular telephone network, the service provider for that network or subscriber will request activation, step 77, of the cellular telephone. Upon receipt of an activation request, the service provider generates activation data for the particular cellular telephone including a telephone number for the cellular telephone and other activation data to be loaded into the cellular telephone in step 78. Once the service provider has generated the activation data, the service provider inputs the activation data into the cellular telephone 12 in step 79. The activation data may be inputted to the cellular telephone by signal line 50 coupled to input port 48 of the cellular telephone or may be transmitted by RF signal 14 directly to the cellular telephone or loaded manually via the keypad. The activation data is initially loaded into volatile RAM memory 56 by processor 52. Once the activation data has been received and confirmed by the cellular telephone 12, the processor transfers the activation data from volatile RAM memory 56, to non-volatile memory 58. In particular, the activation data is written to the addresses in the non-volatile memory corresponding to the area 62 of that memory designated for the activation information.

With the reception of the activation information, the processor 52 determines whether activation date data has been received with the activation information and temporarily stored in RAM 56, in step 80. If no activation date data has been received and stored in RAM 56, then the processor 52 is capable of calculating the current date using the timer 54. The processor in addition may prompt the user via the display 34 to enter the current date at the time of activation so that the processor will have a current activation date to store in the non-volatile memory. (This may occur, for example, if the telephone does not contain a timer.) At step 82, the date data is read by the processor from either the timer or as the date was entered by the user. The date data whether it be recalculated by the timer, inputted by the user responding to a display prompt, or received with the activation data, is temporarily stored in volatile memory 56 in step 84.

The activation information temporarily stored in volatile RAM 56 is automatically transferred from RAM to non-volatile memory 58 by the processor, with the exception of the date information. Before date information is stored in the non-volatile memory 58 the processor determines whether a valid activation date has been previously written to the non-volatile memory at date memory location 64. In step 86, the processor determines whether a memory flag 66 is set. If the memory flag is set, such as to a value=1, the set flag indicates that a valid activation date has already been stored in the date memory location 64. If the flag is set, then the activation date program shown is terminated by ending at step 88.

If the date flag 66 is not set, for example, has a value equal to zero, the processor will write to the date memory location 64 in the non-volatile memory the current activation date stored in volatile RAM memory 56 at step 90. In addition to storing the activation date in non-volatile memory location 64, the processor will set the date flag 66 to a value indicating that an activation date has been stored in the non-volatile memory in step 92.

Figure 4:
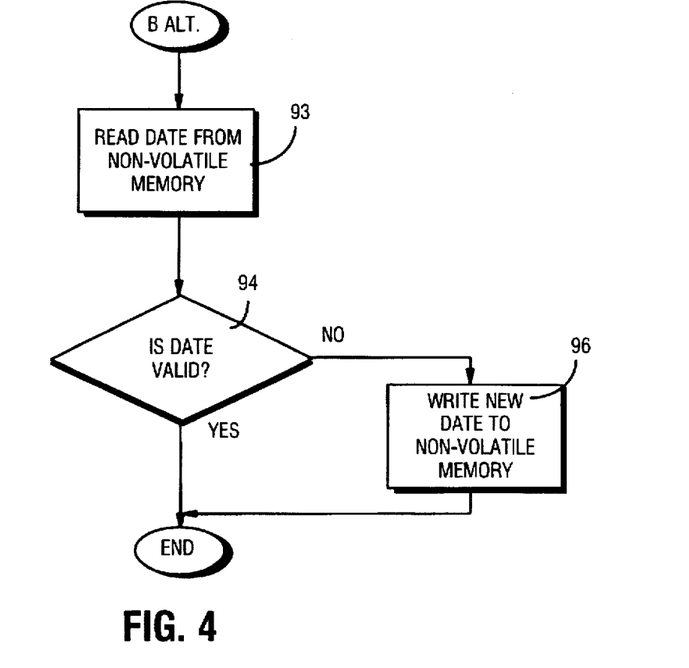
FIG. 4 is an alternative flow chart showing steps of a representative method for determining whether a valid activation date is stored in non-volatile memory.

Alternatively, as shown in FIG. 4 the determination of whether a first activation date has been previously stored in the non-volatile memory may be accomplished without the use of a date flag. Instead of using a date flag, the processor 52 may compare the date data stored in the date memory location 64 of the non-volatile memory to a range of valid dates 91 stored in the non-volatile memory 58. Once the processor reads the date stored in memory location 64, in step 93, the date is compared to the range of valid dates 90 stored in the non-volatile memory 58. If the date read from memory location 64 falls within the range of valid dates, then in step 94 the activation date process is terminated because a valid date already is stored in the non-volatile memory. If the date stored in memory location 64 is an invalid date, such as a date loaded by the manufacturer for testing purposes, then in step 96 the processor writes the date stored in volatile memory in step 84 as the activation date to memory location 64 in the non-volatile memory and then terminates.

Figure 5:
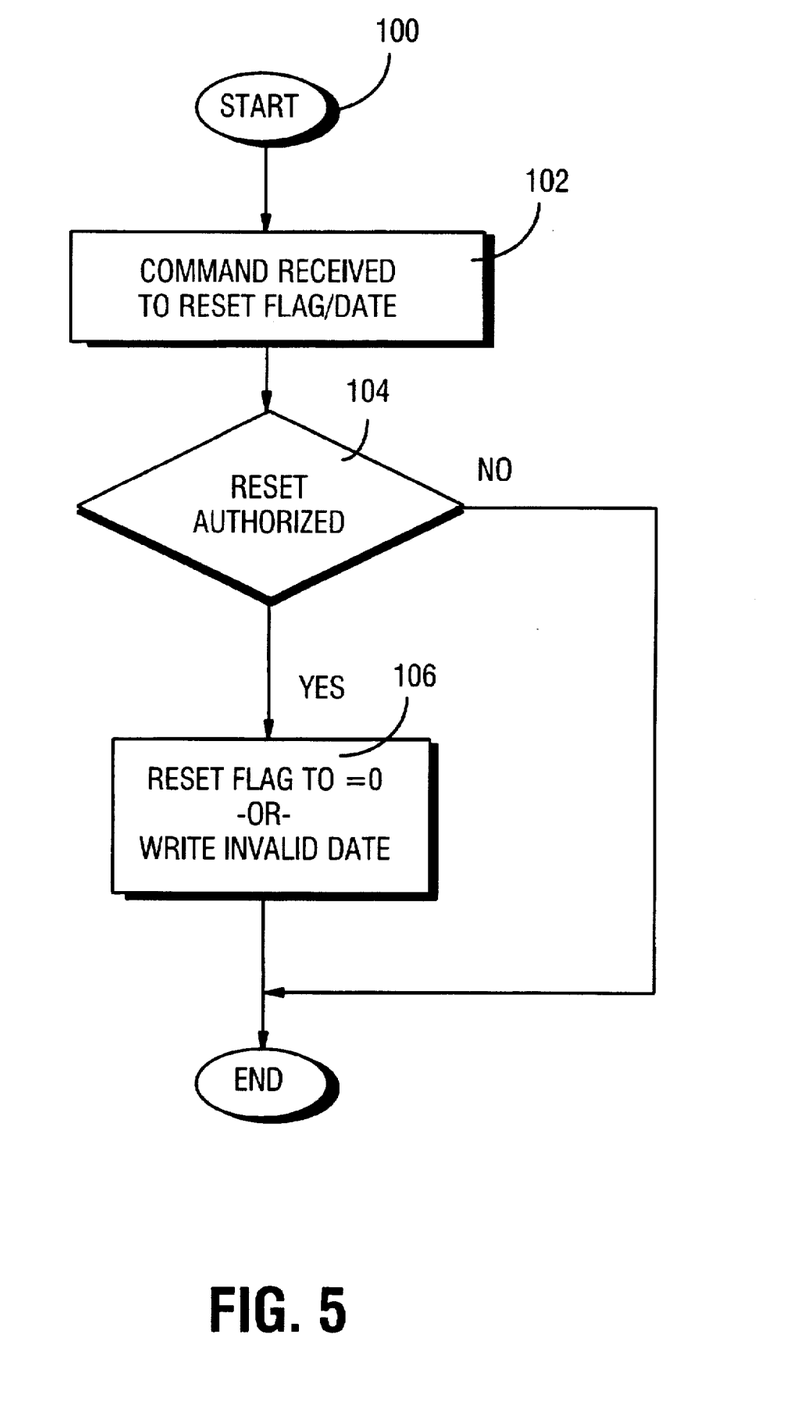
FIG. 5 is a flow chart showing steps of a representative method for reinitializing the activation date memory location.

FIG. 5 presents a flowchart showing the method steps for resetting a valid activation date in memory location 64 of the non-volatile memory. The authorization date is anticipated to be reset by the manufacturer or a service center authorized by the manufacturer for refurbishing cellular telephones. From time to time, cellular telephones are returned to the manufacturer or to an authorized service center for replacement. Cellular telephones that are returned and replaced may be refurbished and later resold by the manufacturer or service center. Refurbished telephones are often sold with a warranty. Establishing the date at which the warranty for the refurbished telephone begins requires that the authorization date stored in non-volatile memory at memory location 64 be reset. Accordingly, FIG. 5 shows a procedure by which a specific command may be entered to the cellular telephone processor 52 to permit resetting the activation date. This reset command is highly proprietary to the manufacturer and authorized service centers, as it has the effect of resetting the activation date by which warranties are determined. This command is not released to the general public and is only used in specific instances by the manufacturer or authorized service center such as refurbishment.

After the cellular telephone has been refurbished, the methods illustrated in FIG. 5 are started. Step 100 begins the process to reset the first activation date in memory location 64. At step 102, the reset command signal or signals are input to the cellular telephone through signal line 50 and into signal port 48 of the cellular telephone that causes the processor 52 to act to reset the date memory location 64 and/or the date flag 66 in non-volatile memory 58. Alternatively, the command may be input manually via the keypad, or using an RF wireless link. Before that command is executed by the processor, the processor determines whether reset has been authorized in step 104. The processor makes the authorization determination by one of several possible methods, some of which are: 1) receipt of an "authorization" command prior to the command 102 to reset the flag/date; 2) receipt of an "authorization" command after the command 102 to reset the flag, or 3) the existence of a predetermined keypad state or signal input state at port 48 or RF input state concurrent with the execution of "reset authorized" test 104.

If the processor is not authorized to reset the date or flag information, then the reset sequence is terminated without rewriting the activation date or date flag. If the processor is authorized to reset the activation date memory location and the date flag, the processor writes an invalid date to memory location 64 in the non-volatile memory (for example, writes 99/99/99 to that memory location) and/or resets the date flag 66 to a value indicating that no valid activation date is stored at memory location 64, in step 106. Once an invalid date is written to the date location 64 and the date flag 66 indicates that no valid date is stored, the refurbished telephone is ready to be resold. Once the refurbished telephone is resold and a customer subscribes to a cellular telephone service, the telephone will be reactivated. During the reactivation procedure, the method recited in FIGS. 3A and 3B and FIG. 4 will be implemented to enter a new first activation date in the memory date location 64.

When a cellular telephone is returned for service to the manufacturer or to an authorized service center, the manufacturer or service center will interrogate the non-volatile memory to determine the first authorization date stored in memory location 64 of the non-volatile memory. From that date the manufacturer or service center can easily calculate the warranty period for that particular telephone. If the telephone is within its warranty, then warranty service may be performed free of charge to the customer. If the warranty has expired for that telephone, the customer can be advised of the cost of the repair or replacement of the telephone. Similarly, a refurbished telephone will have a new first activation date stored in memory location 64 in the non-volatile memory. Based upon this new first activation date, the manufacturer or service center can determine whether the refurbished telephone is under warranty or whether the warranty has expired.

Cellular telephones that are reactivated to a different cellular service provider or to a new account on an existing service provider will not have a new activation date stored in memory location 64. Cellular telephones are often activated multiple times as its user subscribes to different cellular service providers or deactivates and later reactivates accounts with existing service providers. Each time the telephone owner activates a new account with a new or existing service provider, his cellular telephone must receive activation information and store that activation information in non-volatile memory 58 in the activation information location of that non-volatile memory 62. Accordingly, activation information is rewritten in the activation memory location 64 each time the cellular telephone is reactivated to a new account of a telephone service provider. With the present invention, the activation date memory location 64 is not rewritten with second or subsequent activations of the cellular telephone to new accounts of service providers. By preventing rewriting of the activation date memory location 64, it is possible with the present invention to determine the first activation date of the cellular telephone. This determination of a first activation date of the cellular telephone is previously unknown and it provides the benefit of allowing manufacturers and service providers to determine the warranty period for each individual telephone without resort to other records that may or may not exist with respect to the telephone. Accordingly, the present invention solves a long-felt need in the industry for a reliable method for determining the warranty period of individual cellular telephones.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for establishing a first activation date of a cellular telephone having a processor and an associated volatile and a non-volatile memory comprising the following steps:

(a) conveying to a first cellular telephone network service provider a request to activate the cellular telephone;

(b) inputting to the cellular telephone from the cellular telephone network service provider information for activating the telephone for operation in a first cellular telephone network of the first cellular telephone network service provider;

(c) writing an activation data at a predetermined address or addresses of the non-volatile memory of the cellular telephone;

(d) writing a current date at the predetermined address or addresses of the non-volatile memory used for the activation data and designating the current date as the activation date;

(e) communicating with the cellular telephone via the first cellular telephone network;

(f) deactivating the cellular telephone from the first cellular telephone network;

(g) conveying to a second telephone network service provider a request to reactivate the cellular telephone;

(h) inputting to the cellular telephone information for reactivating the telephone received from the second telephone network service provider;

(i) writing a reactivation data at the predetermined address or addresses accessed in step (c);

(j) determining whether the predetermined address or addresses being accessed to write the reactivation data corresponds to a location in non-volatile memory having the activation date stored in step (d);

(k) if the activation date is determined to be present in non-volatile memory step (j), then not overwriting a new date in the non-volatile memory;

(l) if the activation date is determined to not be present in non-volatile memory in step (j), then writing the current date at the predetermined address or addresses of the non-volatile memory.

2. A method as in claim 1 comprising the additional steps of:

(m) returning the cellular telephone to a manufacturer;

(n) refurbishing the cellular telephone by the manufacturer for resale;

(o) clearing the activation date from non-volatile memory;

(p) reselling the cellular telephone to a consumer; and (q) repeating steps (a) to (l).

3. A method as in claim 1 wherein in step (d) the current date is input to the cellular telephone in step (b).

4. A method as in claim 1 wherein in step (g) the second telephone network service provider is the same as the first telephone network service provider.

5. A method as in claim 1 wherein in step (d) a date flag is set in non-volatile memory when the activation date is stored in memory, and in step (k) the determination of whether an activation date is stored is made by checking whether the date flag is set.

6. A cellular telephone for communicating with a radio cellular telephone network comprising:

a processor for executing program instructions related to operating the cellular telephone;

a non-volatile memory accessible by the processor for storing the program instructions, the non-volatile memory having a predetermined memory location for storing activation data regarding the telephone and the predetermined memory location having a preselected location for receiving information indicative of an activation date;

and an input for receiving activation information from a source outside of the cellular telephone;

wherein the processor executes the program instructions to write the activation information to the predetermined memory location upon detecting the receipt of the activation information at the input;

and the processor writes information indicative of a current date to the preselected memory location for storing information indicative of the activation date only if the processor determines that no information indicative of the activation date is already stored at the preselected memory location.

7. A cellular telephone as in claim 6 wherein the preselected memory location for storing information indicative of the activation date has a corresponding settable flag, and the processor sets the flag when writing the current date to the preselected memory location, and checks the flag to determine whether information indicative of the activation date is already stored at the preselected memory location.

8. A method for establishing an activation date of a radio telephone terminal, comprising the steps of:

(a) requesting activation of the terminal by a subscriber;

(b) downloading activation data into a predetermined memory location of the terminal;

(c) determining if the activation data includes an activation date;

(d) storing the activation date in a non-volatile memory location, if the activation data includes an activation date; and (e) performing one of externally entering the activation date or calculating in a processor of the terminal the activation date, and storing the activation date in the non-volatile memory location, if the activation data does not include the activation date.

9. The method of claim 8, further comprising the steps of:

determining whether a valid activation date has been previously stored in the non-volatile location before step (d); and preventing the previously stored activation date from being written over, if valid, until properly authorized.

10. The method of claim 8, further comprising the step of setting a flag in a predetermined memory location in response to a valid activation date being stored in the non-volatile memory location.

11. The method of claim 10, further comprising the step of preventing a previously stored activation date from being written over in the non-volatile memory location if the flag is set.

12. The method of claim 8, further comprising the steps of:

determining whether a previously stored activation date is a valid activation date by comparing the previously stored activation date to a predetermined range of activation dates; and preventing the previously stored activation date from being written over in a non-volatile memory location if the previously-stored activation date is within the predetermined range of dates.

13. The method of claim 8, wherein step (e) comprises the step of prompting the subscriber to enter the present date as the activation date.

14. The method of claim 8, wherein step (e) comprises the step of using a timer in the terminal to calculate the activation date.

15. The method of claim 8, wherein step (b) comprises the step of downloading the activation data into a predetermined volatile memory location, and the method further comprising the step of confirming the activation data before transferring the activation data without any activation date information to a predetermined non-volatile memory location.

16. The method of claim 8, further comprising the authorizing the activation date to be reset.

17. The method of claim 16, further comprising the step of inputting a proprietary reset signal into the terminal.

18. The method of claim 16, further comprising the step of resetting the activation date in the non-volatile memory to a value known to be invalid.

19. The method of claim 16, further comprising the step of resetting a flag to indicate that no valid activation date is stored in the non-volatile memory location.

* * * * *